US012560791B2

(12) United States Patent
Schmidt et al.

(10) Patent No.: US 12,560,791 B2
(45) Date of Patent: Feb. 24, 2026

(54) METHOD AND LIGHT MICROSCOPE FOR LOCALIZING INDIVIDUAL EMITTERS IN A SAMPLE

(71) Applicant: Abberior Instruments GmbH, Goettingen (DE)

(72) Inventors: Roman Schmidt, Goettingen (DE); Andreas Schoenle, Goettingen (DE)

(73) Assignee: Abberior Instruments GmbH, Goettingen (DE)

( * ) Notice: Subject to any disclaimer, the term of this patent is extended or adjusted under 35 U.S.C. 154(b) by 322 days.

(21) Appl. No.: 18/228,902

(22) Filed: Aug. 1, 2023

(65) Prior Publication Data

US 2024/0045190 A1 Feb. 8, 2024

(30) Foreign Application Priority Data

Aug. 4, 2022 (DE) ..................... 10 2022 119 589.9

(51) Int. Cl.
G02B 21/00 (2006.01)
G02B 21/36 (2006.01)

(52) U.S. Cl.
CPC ..... G02B 21/0076 (2013.01); G02B 21/0072 (2013.01); G02B 21/365 (2013.01)

(58) Field of Classification Search
CPC ............ G02B 21/0076; G02B 21/0072; G02B 21/365; G02B 21/00; G02B 21/0004;
(Continued)

(56) References Cited

U.S. PATENT DOCUMENTS

2016/0305884 A1 10/2016 Hell
2018/0259458 A1 9/2018 Hell et al.
(Continued)

FOREIGN PATENT DOCUMENTS

DE 10 2013 114 860 B3 5/2015
DE 10 2016 119 262 A1 4/2018
(Continued)

OTHER PUBLICATIONS

F. Balzarotti et al., Nanometer resolution imaging and tracking of fluorescent molecules with minimal photon fluxes, Science 355 (6325), Feb. 10, 2017, pp. 1-7 and pp. 1a and 1b -72.
(Continued)

*Primary Examiner* — Arnel C Lavarias
(74) *Attorney, Agent, or Firm* — MOSER TABOADA

(57) ABSTRACT

A method for localizing individual emitters in a sample with a first localization step and a second localization step with an increased accuracy including illuminating the emitter with an intensity distribution of the illumination light having a local minimum at illumination positions arranged around the location of the emitter determined in the first localization step, detecting the light emissions of the emitter for the illumination positions, and determining the location of the emitter from the light emissions detected for the illumination positions, wherein a location correction compensating for the systematic deviation is applied to determine the illumination positions in the second localization step, as well as a light microscope and a computer program for carrying out the method.

20 Claims, 5 Drawing Sheets

(58) Field of Classification Search

CPC .............. G02B 21/002; G02B 21/0024; G02B 21/0032; G02B 21/0036; G02B 21/0048; G02B 21/0052; G02B 21/006; G02B 21/008; G02B 21/06; G02B 21/36; G02B 21/361; G02B 21/367; G01N 21/6456; G01N 21/6458; G01N 2021/6463; G01N 21/6486

USPC ....... 359/385, 362, 363, 368, 369, 387, 388, 359/389, 390, 391

See application file for complete search history.

(56) References Cited

U.S. PATENT DOCUMENTS

| | | |
|---|---|---|
| 2020/0393378 A1 | 12/2020 | Hell et al. |
| 2022/0042914 A1 | 2/2022 | Schmidt |
| 2023/0288689 A1* | 9/2023 | Schmidt ............. G02B 21/0076 |
| 2023/0350179 A1* | 11/2023 | Schmidt ............. G01N 21/6458 |
| 2024/0046595 A1* | 2/2024 | Schmidt ............... G02B 6/0008 |
| 2024/0133811 A1* | 4/2024 | Schmidt ............. G01N 21/6458 |
| 2024/0183782 A1* | 6/2024 | Donnert ................. G02B 27/58 |
| 2024/0183783 A1* | 6/2024 | Leutenegger ........ G02B 21/367 |
| 2025/0180482 A1* | 6/2025 | Harke ................ G01N 21/6458 |

FOREIGN PATENT DOCUMENTS

| | | |
|---|---|---|
| DE | 10 2016 119 263 A1 | 4/2018 |
| DE | 10 2016 119 264 A1 | 4/2018 |
| DE | 10 2017 104 736 B3 | 8/2018 |
| DE | 10 2020 122 605 A1 | 3/2022 |
| DE | 10 2021 107 704 A1 | 9/2022 |
| DE | 10 2021 116 504 A1 | 12/2022 |
| EP | 3 372 989 A1 | 9/2018 |
| WO | WO 2020/128106 A1 | 6/2020 |
| WO | WO 2022/112155 A1 | 6/2022 |
| WO | WO 2022/152785 A1 | 7/2022 |

OTHER PUBLICATIONS

Klaus C. Gwosch et al., MINFLUX nanoscopy delivers 3D multicolor nanometer resolution in cells, Nature Methods, 17 (2), 2020, 33 pages, https://doi.org/10.1038/s41592-019-0688-0.

R. Schmidt et al., MINFLUX nanometer-scale 3D imaging and microsecond-range tracking on a common fluorescence microscope, Nature Communications, 2021, pp. 1-12 and pp. 1a - 9,12:1478, doi.org/10.1038/s41467-021-21652-z | www.nature.com/ naturecommunications.

L. A. Masullo et al., Pulsed Interleaved MINFLUX, Nano Letters. 2021, pp. A-G and pp. 1-43, 21 (1), https://dx.doi.org/10.1021/acs. nanolett.0c04600.

E. Slenders et al., ISM-FLUX: single-step MINFLUX with an array detector, bioRxiv, Apr. 19, 2022, pp. 1-7 and pp. 1-9 ,DOI: 10.1101/ 2022.04.19.488747.

* cited by examiner

Fig. 2A                 Fig. 2B

METHOD AND LIGHT MICROSCOPE FOR LOCALIZING INDIVIDUAL EMITTERS IN A SAMPLE

CROSS-REFERENCE TO RELATED APPLICATIONS

The present application claims the benefit of and priority to DE Patent Application Serial No. 10 2022 119 589.9, filed Aug. 4, 2022, the entire contents of which is incorporated herein by reference.

TECHNICAL PRESENT DISCLOSURE

The present disclosure relates to a method, a light microscope, and a non-transitory computer readable medium for localizing individual emitters in a sample according to the MINFLUX principle.

PRIOR ART

The term "MINFLUX microscopy" or "MINFLUX method" is used to summarize a family of localization and tracking methods for individual light-emitting emitters, in which a light distribution of illumination light that induces or modulates light emissions of the emitter is generated at the focus in the sample, the light distribution having a local minimum in at least one spatial direction, and in which the position of an individual emitter is determined by detecting light emissions from the emitter, taking advantage of the fact that the smaller the distance between the emitter and the minimum of the light distribution, the less light is emitted from the emitter (MINFLUX principle). Due to the latter fact, MINFLUX processes are particularly photon-efficient, especially compared to so-called PALM/STORM localization methods. In addition, certain versions of the method also have the advantage that the emitters to be localized are exposed to relatively little light compared to other localization methods and are therefore less bleached.

The individual emitters are in particular fluorophores and the illumination light is in particular excitation light, which excites the fluorophores, whereupon these emit fluorescent light. The light distribution with the local minimum may in particular be 2D-donut-shaped or 3D-donut-shaped.

In particular, patent application DE 10 2013 114 860 A1 describes a localization method in which the sample is scanned at grid points with the local minimum of an excitation light distribution in order to localize individual fluorophores.

The term "MINFLUX" is first used in the publication "F. Balzarotti et al, "Nanometer resolution imaging and tracking of fluorescent molecules with minimal photon fluxes", *Science* 355 (6325), 606-612 (2017)". There, the MINFLUX principle described above is concretely implemented by first pre-localizing an individual fluorophore by scanning it with a first Gaussian-shaped excitation light distribution and then placing a second donut-shaped excitation light distribution at points that form a symmetric pattern of illumination positions around the fluorophore's position estimated in the pre-localization. The photon counts registered for each illumination position are then used to determine the position of the fluorophore to within a few nanometers using a maximum likelihood estimator.

Further variants and embodiments of MINFLUX localization are described in patent applications DE 10 2016 119 262 A1, DE 10 2016 119 263 A1 and DE 10 2016 119 264 A1.

The publication "K. C. Gwosch et al, "MINFLUX nanoscopy delivers 3D multicolor nanometer resolution in cells", Nat. Methods, 17 (2), 217-224 (2020)" describes iterative 2D and 3D MINFLUX localization methods. In this method, the sample is illuminated in several iteration steps at illumination positions with the minimum of a donut-shaped excitation light distribution, wherein the illumination positions form a symmetric illumination pattern centered around the position of the fluorophore estimated in each previous step, and wherein the illumination positions are placed closer around the currently estimated position of the fluorophore in each iteration step. This allows very high positional accuracy to be achieved in a few steps.

Another iterative MINFLUX localization and tracking method using a modified position estimator and based on a commercial microscope setup is described in "R. Schmidt et al, "MINFLUX nanometer-scale 3D imaging and microsecond-range tracking on a common fluorescence microscope," Nat. Commun. 12 (1), 1478 (2021)".

The light that induces or modulates the light emission of the particles may also be STED (stimulated emission depletion) light, for example. For example, patent applications DE 10 2017 104 736 A1 and EP 3 372 989 A1 describe MINFLUX-like methods based on superposition of an excitation light distribution with local maximum with a STED light distribution with local minimum. The sample is scanned by shifting the STED distribution with the STED minimum and the position of the fluorophore is determined from the measured values of fluorescence intensity at different positions of the STED intensity distribution. These methods also belong to the "MINFLUX methods" in the sense of the present disclosure.

Patent application WO 2020/128106 A1 and the publication "L. A. Masullo et al., "Pulsed Interleaved MINFLUX," Nano Lett. 21 (1), 840-846 (2021)" describe, among other things, embodiments of MINFLUX localization methods in which the positions at which the sample is illuminated with the minimum of the excitation light distribution are fixed by arrangements of optical fibers, wherein the excitation light is generated by a pulsed laser, and wherein individual excitation light pulses are output with a time delay through the different fiber ends of the optical fibers.

In the publication "E. Slenders, G. Vicidomini, "ISM-FLUX: single-step MINFLUX with an array detector, bioRxiv, DOI: 10.1101/2022.04.19.488747 (2022)", a MINFLUX method is described in which the light emitted from a single fluorophore is detected in a position-dependent manner using an array detector to determine the position of the fluorophore in a single localization step non-iteratively, i.e. without repositioning the illumination pattern and without pre-localization.

However, position determination without pre-localization has, in particular, the disadvantage that photoactivation is necessary to obtain individual light-emitting fluorophores in the image field. This limits the applicability of the method, since not all fluorophores can be photoactivated.

In many cases, pre-localization is still essential to obtain an initial position estimate, on the basis of which the MINFLUX procedure is then performed.

In order to achieve the highest possible position accuracy, the pre-localization and the MINFLUX method as a whole must use a photon budget that is limited for each emitter as efficiently as possible. Depending on the specific design of the pre-localization, however, there may be considerable systematic deviations between the initial position estimate determined in the pre-localization and the position of an emitter determined with the MINFLUX method. This results in a suboptimal position accuracy, since the MINFLUX localization consumes more photons than actually necessary due to the systematically incorrect initial position.

OBJECTIVE OF THE PRESENT DISCLOSURE

Based on the above-described drawbacks of the prior art, the objective of the present disclosure is to improve the photon efficiency and/or position accuracy of a MINFLUX localization method for individual emitters in a sample.

Solution

This objective is attained by the subject matter of independent claims. Advantageous embodiments of the present disclosure are indicated in subclaims and are described below.

DESCRIPTION

A first aspect of the present disclosure relates to a method for localizing individual emitters in a sample, comprising a first localization step comprising the method steps of
  illuminating the sample with illumination light, wherein the illumination light induces or modulates light emissions from an emitter;
  detecting the light emissions of the emitter;
  determining the location of the emitter in the sample from the detected light emissions.
The method further comprises a second localization step with an increased accuracy compared to the first localization step, wherein the second localization step comprises the method steps:
  illuminating the emitter with an intensity distribution of the illumination light or another illumination light comprising a local minimum in at least one spatial direction at illumination positions arranged around the location of the emitter determined in the first localization step;
  detecting the light emissions of the emitter for the illumination positions;
  determining the location of the emitter from the light emissions detected for the illumination positions.
The method is characterized in that the location of the emitter determined in the first localization step comprises a systematic deviation with respect to the location of the same emitter determined in the second localization step, and in that a location correction compensating for the systematic deviation is applied to determine the illumination positions in the second localization step.

The term emitter refers to the unit whose location in the sample is to be determined by the localization method. Accordingly, light emission may occur directly by the emitter itself or indirectly by markers coupled to the emitter (e.g., fluorescence markers covalently or non-covalently bound to a protein). By light emission is meant not only the active emission of light by the emitter or the markers in the sense of luminescence, but also light emission caused by (Raman/ Rayleigh/Mie) scattering. Specifically, the emitter or the markers coupled to the emitter are in particular molecules of a fluorescent dye, fluorescent nanoparticles (e.g., quantum dots) or light-scattering nanoparticles such as gold nanoparticles or gold nanorods.

Individual emitters are defined here as emitters that can be separated or resolved by optical means. In particular, this may mean that the emitters have a spatial distance from each other that is above the optical diffraction limit of light microscopy. In this sense, however, emitters are also individual if they can be registered one after the other, for example, by registering a first emitter at a time when an adjacent emitter is not emitting light because it is in a dark state (in the case of fluorophores). In this way, emitters that have a distance below the diffraction limit but are blinking asynchronously may also be resolved by light microscopy. Finally, it is also possible to resolve emitters that have a spacing below the diffraction limit but emit light of different wavelengths by optical microscopy by spectrally separating the emitted light, or to excite two emitters with different excitation spectra with different wavelengths to optically separate the emitters. Finally, emitters that have different emission lifetimes may be distinguished from each other by measuring the lifetime (e.g., by time-resolved single photon counting) and thus detected separately. All of these embodiments fall under the term "individual emitters".

In the first localization step, the location of one or more emitters in the sample is initially determined with low(er) accuracy in order to obtain a starting value for the (highly) accurate location determination of the emitter(s) in the second localization step. For this purpose, the emitter is illuminated with illumination light, which is in particular excitation light that excites the emitter(s) to fluorescence or is scattered by the emitter(s), thus inducing light emission. Alternatively, the illumination light may also modulate, in particular inhibit, the light emission. Examples include STED light, which quenches the excited state of fluorophores by stimulated emission, or switching light, which may, for example, convert fluorophores from a fluorescent state to a dark state, such as a triplet state. Illumination light, which modulates light emission, is used in particular in combination with excitation light.

A point detector (such as an avalanche photodiode, APD, photomultiplier, or hybrid detector) or a spatially resolving area detector (such as a camera or APD array) may alternatively be used to detect the light emission of the emitter. The location of the emitter is determined from the light emission, and the location determination may be made from spatially resolved detection of the light emission (e.g., from an epifluorescence image) or light emissions registered at multiple positions of the illumination light (e.g., from a confocal image acquisition). The location of the emitter may be determined in each case, for example, by centroid determination or momentum determination.

In the second localization step, the emitter is localized by a method according to the MINFLUX principle, i.e., the emitter is illuminated at several illumination positions arranged around the location of the emitter determined in the first localization step with an intensity distribution of illumination light having a local intensity minimum in at least one spatial direction. The second localization step does not necessarily have to follow the first illumination step immediately; optionally, further localization steps may take place between the first and the second localization step; the only decisive factor for the method according to the present disclosure is the presence of a first and a second localization step.

According to one embodiment of the method, the illumination positions are arranged at discrete positions around the emitter. These positions may be freely chosen, wherein the number of illumination positions may be reduced to a minimum. Alternatively, the positions may also be arranged in a regular manner, i.e., on a grid, wherein the grid covers only a close range of particularly at most 1 μm, more particularly at most 500 nm and even more particularly at most 100 nm, around the emitter.

According to a further embodiment of the method, the illumination positions are not arranged at discrete points around the emitter, but the illumination is continuous along an illumination trajectory that encloses the emitter. In this case, the assignment of detected light emissions to an illumination position may be performed in a manner similar to continuous scanning in scanning microscopy, for example, by defining corresponding time intervals (so-called dwell times) and assigning the light emissions to an average illumination position during the corresponding time interval. Alternatively, the assignment of light emission to illumination position may also be done by registering the current illumination position as soon as a photon of the light emission is detected.

A sequence of illumination positions may optionally be run through once or several times. Alternatively, a variable or even random sequence of illumination positions is also possible. It is particularly advantageous to recalculate the illumination positions on the basis of a localization of the emitter, in particular iteratively, and to arrange them successively closer around the (actual) location of the emitter.

Like the illumination light used in the first localization step, the illumination light used in the second localization step may also induce or modulate, in particular inhibit, the light emission of the emitter. In this context, the illumination light used in the second localization step may be identical to the illumination light used in the first localization step, but this is not mandatory. For example, the wavelength of the illumination light may be identical in both localization steps, but switched between different intensity distributions of the light. For example, for a localization of an emitter from a confocal image in the first localization step and a localization of the emitter according to a MINFLUX principle in the second localization step, it is necessary to switch from a Gaussian-shaped mode to a donut-shaped mode having an intensity minimum. Such a switch may be realized, among other things, with a programmable phase modulator (spatial light modulator, SLM).

To determine the location of the emitter in the second localization step, the light emissions of the emitter are detected for the illumination positions, and from the light emissions detected for the illumination positions, the location of the emitter is finally determined. For this purpose, position estimators are used in particular, such as those known from the prior art on the MINFLUX method (see, e.g., "F. Balzarotti et al, "Nanometer resolution imaging and tracking of fluorescent molecules with minimal photon fluxes," *Science* 355 (6325), 606-612 (2017)".

The local intensity minimum may be a point, a line or a surface, ideally an intensity zero, zero line or zero surface. Specifically, the intensity distribution may be a 2D donut or a 3D donut (also referred to as a bottle beam). Such intensity distributions may be generated, for example, by phase modulating the illumination light with a phase plate or a so-called spatial light modulator (SLM). The skilled person is familiar with corresponding methods from the prior art for STED and MINFLUX microscopy.

The positioning of the intensity distribution of the illumination light in the sample may be realized by beam displacement (e.g., electrooptically or by means of a galvanometric scanner), sample displacement (e.g., by means of a sample holder movable with a piezoelectric actuator) or by controlling specific point light sources such as fiber ends of an optical fiber.

In the light microscopic localization of individual, in particular fluorescent, emitters, the factor limiting the localization accuracy is usually the limited light emission of an emitter until its irreversible bleaching. A particularly efficient localization in the second localization step, i.e., a determination of the location of the emitter as precisely as possible from a few illumination positions and little emitted light, is possible in particular if the illumination positions are arranged at a very small distance from the actual location of the emitter. In this respect, a maximum distance of the illumination positions from the location of the emitter of 100 nm, particularly of 50 nm and more particularly of 30 nm, is aimed for. On the other hand, however, it must be ensured that the emitter is located within the area bounded by the convex envelope of the illumination points. Indeed, the localization of the emitter in the second localization step benefits from the process-specific advantages of the MINFLUX principle (in particular the highly accurate localization at low light emission of the emitter) only if the emitter is located within the intensity increasing regions adjacent to the intensity minimum, in particular close to the intensity minimum. If the emitter is located outside these intensity increasing regions, i.e., outside the intensity maxima surrounding the intensity minimum, the MINFLUX-specific advantages over stochastic localization methods such as STORM and PALM microscopy do not apply. If the emitter is located far outside the intensity maxima, the location of the emitter can no longer be unambiguously determined at all from the light emissions detected for the illumination positions (limited MINFLUX catch range).

In order to enable a dense arrangement of the illumination positions under consideration of the mentioned boundary conditions in the second localization step, a localization of the emitter as exact as possible is to be aimed at already in the first localization step. In practice, there is regularly the problem that a systematic deviation occurs between the location determination of an emitter in the first localization step and in the second localization step. This systematic deviation does not have to be homogeneous over the field of view but can be (and in most applications is) location-dependent, i.e., dependent on the location of the emitter in the field of view. In this respect, a systematic deviation is only to be understood as the fact that, in the case of repeated localizations of one and the same emitter, equal deviations occur between the first and the second localization within the scope of the measurement accuracy. Regardless of this, the systematic deviations can be subject to (slow) changes, for example as a result of drift effects, so that a temporal adjustment of the location correction becomes necessary.

In order to enable an arrangement of the illumination positions close around the emitter despite a systematic deviation between the two localization steps, the method according to the present disclosure provides for determining the illumination positions for the second localization step by applying a location correction. This location correction serves to assign the location of an emitter determined in the first localization step to a corresponding location in the second localization step, i.e., it maps the coordinates of the emitter in the coordinate system of the first localization to the corresponding coordinates of the same emitter in the coordinate system of the second localization. The location correction will generally be in two or three spatial directions, so correction vectors must be determined for the location correction. Provided that only one spatial direction is of interest or the systematic deviation can be reduced to a single dimension due to existing or assumed symmetries, the location correction requires only scalar correction values. If in the following one speaks of correction values, this expressly includes correction vectors.

The correction values used for the location correction may be determined in advance, i.e., before the first localization of an emitter. For this purpose, model calculations or simulations of the optical beam paths may be performed to determine corresponding points in the first localization step and in the second localization step and corresponding correction values. Since the imaging properties of the optical elements in the beam paths are often not known with sufficient accuracy and/or variances of the optical elements of a given type do not allow sufficiently accurate modeling, corresponding points may alternatively be determined with calibration measurements. For this purpose, a point-shaped reference object, in particular a gold nanoparticle, may be positioned at different positions in the field of view with a nanopositioner and successively localized with the first and second localization methods.

With respect to the image acquisition modality used in the first localization step, the method according to the present disclosure is variable.

In one embodiment of the method, the first localization step is performed according to a stochastic localization method known in particular from the prior art. These include, in particular, STORM (stochastic optical reconstruction microscopy) and PALM (photoactivated localization microscopy) microscopy as well as SOFT (superresolution optical fluctuation imaging) microscopy and PAINT (points accumulation for imaging in nanoscale topography) microscopy. Here, the emitters are present in a non-fluorescent dark state, and individual emitters are converted from this dark state to a fluorescent state spontaneously, by photoactivation or by chemical reaction, or there is an equilibrium between the non-fluorescent dark state and the fluorescent state that can be influenced by adjusting the experimental parameters. For the localization of these activated emitters, the field of view is in particular homogeneously illuminated with the illumination light, so that all activated emitters in the field of view are simultaneously excited to emit light. In this case, the detection of the light emission is particularly performed with a spatially resolving or imaging detector, i.e., a detector that comprises a plurality of individually readable detector elements, in particular with a camera. The location of the individual, i.e., optically separable emitters, may thus be determined by determining the center of gravity or fitting a model function in the image. Thus, in the case that the first localization step is performed with a stochastic localization method, in particular a plurality of emitters are imaged in parallel. The location of one of these emitters may then serve as the basis for the illumination positions in the second localization step.

In a further embodiment of the method, the first localization step is performed by scanning the sample with the illumination light. I.e., in particular, the first localization step is performed by means of laser scanning, which may alternatively be performed as conventional confocal laser scanning or as STED laser scanning. For this purpose, the sample is scanned point by point with focused excitation light and an image is reconstructed from the light emissions detected at each raster point, in which in turn the individual emitters can be localized. For image acquisition in STED mode, the excitation light is superimposed with a distribution of de-excitation light having a local intensity minimum, which improves the resolution beyond the optical diffraction limit and allows a more accurate localization of the emitter in the first localization step.

In a further embodiment of the method, the first localization step is already performed according to a MINFLUX method (according to a MINFLUX principle), wherein in practice the first and second localization steps are usually steps of an iterative MINFLUX method in which the location of the emitter is determined in each iteration and the illumination positions are adjusted on the basis of the respective last location determination, in particular arranged more densely around the emitter. At the same time, the intensity of the illumination light is typically increased in each iteration. Although a systematic deviation in the localization of an emitter in successive iterations of the MINFLUX method is not obvious, in practice a systematic offset is regularly observed, which is presumably due to a not perfectly rotationally symmetric intensity distribution of the illumination light. For the convergence of the iterative MINFLUX method, it is therefore advantageous to correct the location of the emitter determined in each iteration in accordance with the present disclosure in order to determine the illumination positions for the subsequent iteration.

In a further embodiment of the method, the sample is illuminated with structured illumination light in the first localization step, wherein the location and/or the orientation of the structured illumination light is offset or rotated stepwise relative to the sample, an image of the sample is recorded with an imaging detector for each offset or orientation, and the individual images are processed to form a higher-resolution image. This procedure is known from structured illumination microscopy (SIM) and also delivers a resolution that is already up to two times higher than that of conventional image acquisition.

According to a further embodiment, the emitter is imaged in the first localization step onto a position-resolving detector, in particular a camera or a detector array. Although in some of the previously described embodiments—the localization of the emitter in the first localization step by means of scanning (in particular laser scanning) or according to a MINFLUX method—the detection of the light emission may be performed with a point detector (APD, photomultiplier), the use of a spatially resolving detector, in particular a camera or a detector array, is often advantageous also in these embodiments. By analyzing the spatially resolved image information, it may be detected, for example, when multiple emitting emitters are located within a diffraction-limited area and cannot be located individually.

According to a further embodiment, the systematic deviation is caused by optical imaging errors. Systematic deviations between the emitter locations determined in the first localization step and in the second localization step often occur as a result of optical imaging errors and, in particular, when the optical beam path used for location determination in the first localization step differs from the optical beam path used for location determination in the second localization step or when the first and the second localization steps are performed with optical means that differ from one another in at least one optical element.

According to a further embodiment, the first localization step and the second localization step are carried out with optical means that differ from one another in at least one optical element.

As soon as the beam paths differ, it becomes necessary to align the beam paths to each other and, if necessary, to keep them constant over a longer period of time. In addition, the imaging properties of the two beam paths are usually different, so that as a result of different imaging errors, in particular spherical aberrations, lateral chromatic aberrations, coma and astigmatism, the images produced by the two beam paths are no longer congruent over the entire image area.

However, a systematic deviation in the location determination of the emitter in the first localization step and in the second localization step may also occur if the same optical beam path with the same optical elements but different intensity distributions is used in both steps. For example, the actual center of gravity of an intensity distribution of the illumination light (e.g., a donut-shaped light distribution) in the second localization step may deviate from the nominal center of gravity (in the case of the donut-shaped light distribution, the central zero) and thus from the center of the light distribution used in the first localization step, causing the localizations to systematically deviate from each other. An intensity-dependent deviation may also occur if the illumination positions include positions where the emitter is illuminated with light intensities that lead to saturation of the excitation, i.e., there is no longer a linear dependence of the light emission of the emitter on the intensity of the illumination light at the position of the emitter. This case may occur, for example, if the first localization step is also carried out with a MINFLUX method, but with illumination points that are further away from each other and/or lower intensity of the illumination light.

The systematic deviation of the localization of an emitter in the first localization step and in the second localization step can in the simplest case be homogeneous over a field of view of interest, so that it is sufficient to add a single correction value in the form of an offset to the location of the emitter determined in the first localization step and to determine the illumination positions in the second localization step based on this corrected location. If the first localization step uses a MINFLUX method, such an offset correction may also be directly taken into account in a position estimator.

Much more frequently, however, the situation is encountered that the systematic deviation is not homogeneous but depends on the location of the emitter in the sample and the location correction must be carried out with location-dependent correction values or correction vectors. Therefore, position-dependent correction values or correction vectors are used for the location correction according to a further embodiment. In this case, it may be possible to take advantage of the fact that the systematic deviation has rotational symmetry with respect to an optical axis, as is the case, for example, when the deviation is caused entirely or substantially by spherical aberrations, defocus, color magnification errors or other rotationally symmetrical aberrations. In these cases, the correction values for location correction need not necessarily be held out as a function of two (xy) or three (xyz) coordinates but can be reduced to a function of one radial parameter due to rotational symmetry. Therefore, according to a further embodiment, the correction values or correction vectors comprise a rotational symmetry with respect to an optical axis or such a rotational symmetry is assumed.

According to a further embodiment, the first and second localization steps are repeatedly carried out on different emitters, wherein initially assumed correction values or correction vectors are updated in each case after the second localization step using the difference of the locations of the emitter determined in the first localization step and in the second localization step.

In a particular embodiment of the method, in which the first and second localization steps are repeatedly performed at different emitters, the correction values used for the location correction may not only be determined once but may be continuously supplemented and/or updated during the (repeated) localization of emitters. This not only allows for continuous improvement and/or addition of correction values at additional positions in the field of view, but also allows for correction of drifts over time. The method may also be designed such that the correction values are initialized to zero at the beginning of a series of localizations, so that the illumination positions are initially determined based on the uncorrected location determinations from the first localization step. With each localization of an emitter, a correction value may now be determined from the difference between the location of the emitter determined in the first localization step and in the second localization step and stored in a memory. If in the course of the localizations another emitter is located at a position where an emitter has already been localized before, the location of the emitter determined in the first localization step may be corrected with the correction value determined before (with the previously localized emitter). For this emitter, the illumination positions for the second localization step may now be determined based on the corrected location determination, allowing a denser arrangement around the emitter. In this embodiment, the availability of correction values gradually increases with the number of localized emitters. Optionally, the correction values may be updated over multiple measurements or even permanently to build up an increasingly dense distribution of correction values over the field of view. If necessary, multiple sets of correction values may be kept corresponding to different optical configurations when performing the first and/or the second localization step. Different optical configurations may result in particular from an objective change.

As already explained, in most applications the systematic deviation of the location determination in the first localization step and in the second localization step varies over the field of view. Since correction values can only be determined for a limited number of points in the field of view, there is therefore a need to interpolate the correction values for arbitrary points in the field of view from the known correction values. For this purpose, in a particular embodiment of the method, the correction values or correction vectors are organized as nodes in a correction network. The correction vector for the location of an emitter determined in the first localization step may be interpolated by interpolation from the correction vectors of neighboring nodes.

According to a further embodiment, the systematic deviation is modeled by correction values or correction vectors arranged at nodes of a correction network, in particular wherein the location correction is calculated by interpolation of several correction values or correction vectors of the correction network.

According to a further embodiment, correction values or correction vectors of the correction network are updated or additional nodes with correction values or correction vectors are added to the correction network after the second localization step.

In particular, after each localization of an emitter, another node with a correction value or correction vector can be inserted into the correction network at its position, which mediates from the location of the emitter in coordinates of the first localization to the location of the emitter in coordinates of the second localization. For practical reasons—the location of the emitter in coordinates of the first localization is to be transformed into the coordinate system of the second localization—it makes sense to base the nodes of the correction network on the coordinate system of the first localization. In this way, the correction network is extended by a further node with each localization of an emitter and thus becomes successively more closely meshed.

Alternatively, the number of nodes of the correction network may be kept constant or limited to a maximum number. Also, the nodes may be arranged on a regular grid. Instead of adding new nodes to the correction network each time an emitter is localized, it is then recommended to update the nodes surrounding the newly localized emitter. In this way, time-dependent changes in the systematic deviations—for example as a result of drift—may also be detected and taken into account.

In the simplest case, the correction vectors of the correction network may be initialized to zero (–vectors) before the start of the localizations, other possibilities consist in taking over correction values determined in separate calibration measurements or in previous measurements. For this purpose, for example, a point-shaped emitter (e.g., a gold nanoparticle) may be positioned at previously determined positions of the network nodes, in particular on a regular grid, with a nanopositioner and successively localized with the first and second localization methods. Provided that the optical imaging system is known with sufficient accuracy, initial values for the correction vectors may also be derived from optics simulations.

According to a further embodiment, the systematic deviation is modeled by a parameterized compensation model, in particular by a polynomial function or by a linear combination of orthogonal functions.

As an alternative to a correction network, correction values or correction vectors may also be calculated with the aid of a parameterized compensation model. The parameters of the compensation model are to be determined in particular so that the difference between the location of an emitter determined in the first localization step and in the second localization step on the one hand and the correction value or correction vector calculated according to the compensation model on the other hand match, i.e. that the difference between the measured location differences and the location differences calculated according to the compensation model are minimized—in particular in the sense of an error squared sum.

The compensation model may be designed as a (vector) function that assigns a correction value or a correction vector to each point in the field of view. Particular (vector) functions are in particular polynomial functions and linear combinations of orthogonal functions, wherein the polynomial coefficients or the weighting factors of the linear combination are the parameters of the compensation model.

The values for the parameters of the compensation model may again be determined in previous measurements or in dedicated calibration measurements.

According to a further embodiment, the first localization step and the second localization step are repeatedly performed with different emitters, with the parameters of the compensation model being updated after the second localization step in each case.

Also when using a compensation model to calculate the correction values or correction vectors, it is advantageous to update the parameters of the compensation model successively when the first and second localization steps are repeatedly performed on different emitters. In this case, (as described previously for the correction network) the parameters of the compensation model may be initialized to zero, so that initially no correction is made to the locations of the emitters determined in the first localization step. The compensation model may be updated by adjusting the parameters after each or after a predetermined number of localized emitters (for example, by a least squares fit), so that the compensation model provides successively more accurate correction values.

In another embodiment of the method, the correction values or correction vectors are calculated using a machine learning algorithm, in particular an artificial neural network. The machine learning algorithm may be pre-trained, for example using emitters localized in previous measurement sessions or from dedicated calibration measurements as described in the other embodiments previously. However, the machine learning algorithm may also be trained during repeated localizations of emitters, in which case the output of the algorithm may be controlled based on the localizations of the emitters, and the location correction may be applied only after the output of the algorithm has reached a sufficient level of confidence.

A second aspect of the present disclosure relates to a light microscope for localizing individual emitters in a sample, in particular according to the method of the present disclosure. For this purpose, the light microscope comprises a light source for illuminating the sample with illumination light, wherein the illumination light induces or modulates light emission from emitters in the sample, optical means including a beam positioning device and configured to generate and position in the sample an intensity distribution of the illumination light or another illumination light comprising a local minimum in at least one spatial direction, at least one detector configured to detect light emissions from the emitters, a control and computing unit comprising a memory for correction values or correction vectors.

In particular, the light source comprises one or more lasers.

In particular, the beam positioning device is configured to position the intensity distribution of the illumination light at illumination positions in the sample within a viewing range of interest.

Particularly, the beam positioning device is configured such that the intensity distribution can be repositioned at least between illumination positions that have a distance of less than 500 nm, particularly of less than 250 nm and more particularly of less than 100 nm from each other, within 10 µs, particularly within 5 µs and more particularly within 1 µs. For this purpose, the beam positioning device may in particular comprise an electro-optical deflector (EOD) or an acousto optical deflector (AOD). Optionally, beam positioning device may be configured as a combination of a fast positioning device with a slower positioning device covering a larger positioning range.

For the formation of the intensity distribution of the illumination light comprising a local minimum, the optical means typically comprise a light modulator, for example a phase plate or a programmable wavefront modulator (e.g., a spatial light modulator, SLM) with individually controllable pixels. In particular, the light modulator is configured to modulate a phase distribution of the illumination light, particularly in a plane conjugate to the pupil of the objective (i.e., a Fourier plane with respect to the image plane), so that the intensity distribution comprising the local minimum is formed at the focus in the sample.

The control and computing unit is configured to, in a first localization step, i) control the light source such that the light source illuminates an emitter with the illumination light, ii) control the detector such that the detector detects the light emissions from the emitter, and iii) determine the location of the emitter in the sample from the light emissions detected by the detector.

The control and computing unit is further configured to, in a second localization step, iv) using correction values or correction vectors stored in a memory or the memory, to calculate illumination positions around the location of the emitter determined in the first localization step, v) to control the light source and/or the optical means in such a way that the light source illuminates the sample with the intensity distribution of the illumination light or the other illumination light at the illumination positions, the intensity distribution comprising a local minimum, vi) control the detector or a further detector such that the detector or the further detector detects the light emissions of the emitter for the illumination positions, and vii) calculate a location of the emitter in the sample from the detected light emissions.

In particular, the control and computing unit is configured to determine the illumination positions at an optimum distance from the emitter from the location of the emitter determined in the first localization step and the correction values or correction vectors stored in the memory, where optimum distance is to be understood as the smallest possible distance from the emitter under the boundary condition that the actual location of the emitter is within the convex envelope of the illumination positions.

The illumination light used in the second localization step may be the same illumination light as in the first localization step; however, it may also be a different illumination light, in particular with a different wavelength, different intensity distribution or different light power. For this purpose, the light microscope may comprise a second light source, in particular a second laser.

According to a further embodiment, the light microscope comprises a first detector configured to detect the light emissions from the emitter in the first localization step, wherein the light microscope comprises a further second detector configured to detect the light emissions from the emitter in the second localization step.

A particular embodiment of the light microscope is characterized in that the detector or the further detector comprises a plurality of detector elements. In particular, the detector elements can be read out individually. In particular, the detector or an electronic evaluation system coupled to the detector is configured to register individual photons emitted by the emitter and detected by the detector elements. Evaluation electronics (e.g., a so-called TCSPC module) may be provided for this purpose. The same detector may be used for detecting the light emissions in the first localization step and in the second localization step, or different detectors may be used, e.g., a camera in the first localization step and a point detector or an APD array in the second localization step.

In a further embodiment of the light microscope, the control and computing unit is configured to update or supplement the correction values or correction vectors stored in the memory after the second localization step.

A third aspect of the present disclosure relates to a non-transitory computer readable medium for storing computer instructions for localizing individual emitters in a sample that, when executed by one or more processors associated with a light microscope causes the one or more processors to perform the method according to the first aspect.

Advantageous further embodiments of the present disclosure result from the claims, the description and the drawings and the associated explanations to the drawings. The described advantages of features and/or combinations of features of the present disclosure are merely exemplary and may have an alternative or cumulative effect.

In the following, embodiments of the present disclosure are described with reference to the figures. These do not limit the subject matter of this disclosure and the scope of protection.

BRIEF DESCRIPTION OF THE FIGURES

FIG. 2A to FIG. 2C shows an example of a correction network;

DESCRIPTION OF THE FIGURES

Figure 1:
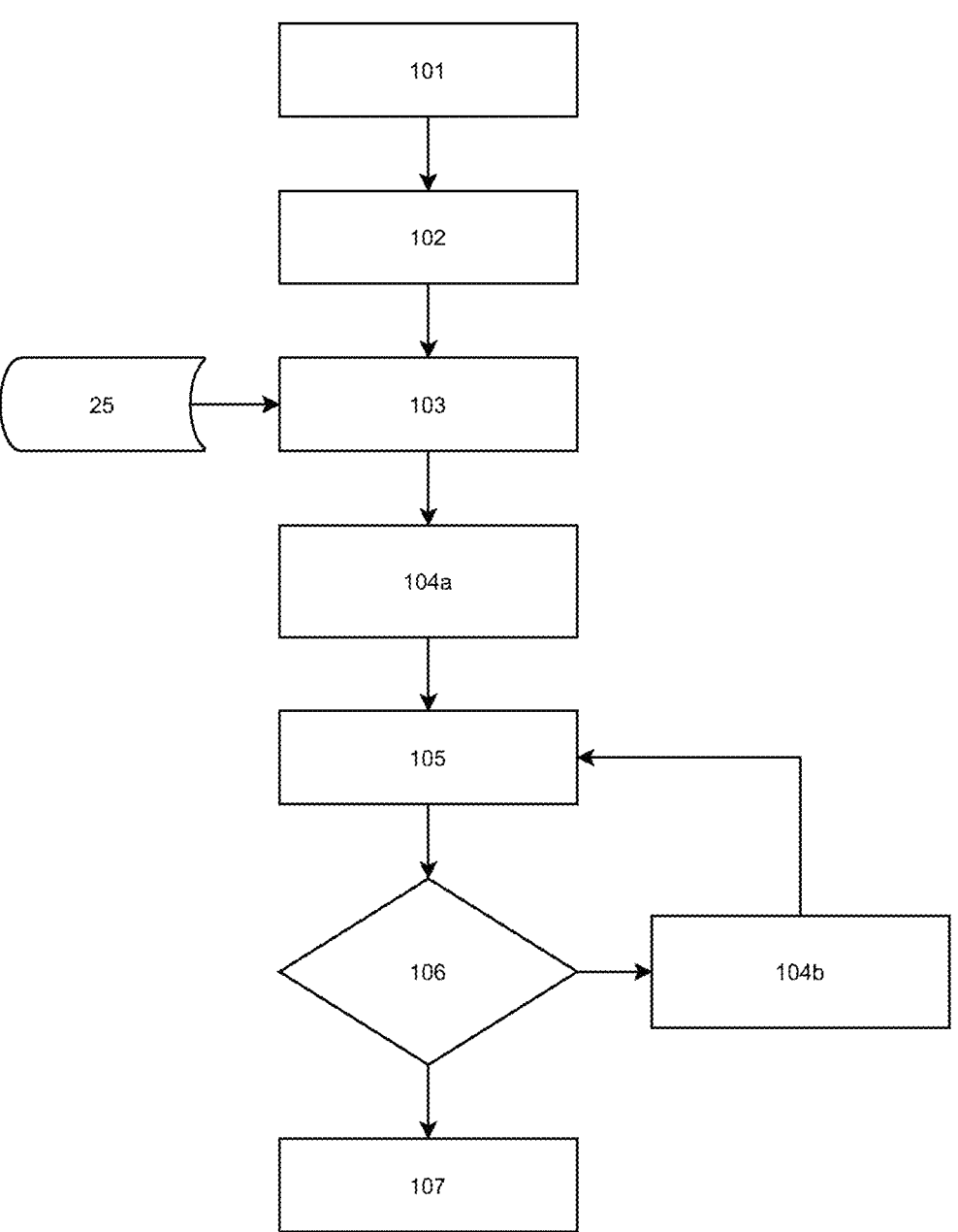
FIG. 1 shows a flow chart of an example of the method according to the present disclosure.

FIG. 1 shows a flow chart of an exemplary method according to the invention. In step 101, an individual emitter E (in particular a fluorophore or a particle labeled with fluorophores) is first selected in a sample 2 illuminated with illumination light B that induces or modulates light emissions of the emitter E, in particular excitation light. The selection may be done by assigning light emissions detected with a point detector 51 (See FIG. 5) to the individual emitter E or by detecting the light emissions of multiple emitters E with a spatially resolving detector 52 (See FIG. 5) and selecting an individual emitter E from these multiple emitters E automatically or manually. For this purpose, the sample 2 may be scanned with the illumination light B or illuminated in the wide field.

Next, in step 102, the location of the selected emitter E is determined from the detected light emissions in a first localization step. For example, the light emissions may be assigned to specific scan positions of a light beam of the illumination light B scanning the sample 2 and thus the location of the emitter E can be determined, such as is known from confocal laser scanning microscopy. Alternatively, the location may be determined by means of stochastic localization microscopy, for example, using the PALM/STORM, SOFI or PAINT method. For this purpose, a time series of images of several emitters E in the sample is recorded, in particular with a spatially resolving detector 52 (See FIG. 5), with the emitters E blinking asynchronously, i.e., changing, in particular periodically, between a non-emitting state and an emitting state. In this way, the location of the individual emitter E may be determined with a resolution below (i.e., better than) the diffraction limit for a corresponding number of detected photons.

In step 103, illumination positions 20 are determined for a second localization step according to the MINFLUX principle on the basis of the location of emitter E determined in the first localization step and on the basis of location correction data 25. The illumination positions 20 form an illumination pattern 24 around the location of the emitter E determined in the first localization step, e.g. a symmetrical hexagonal pattern (see FIG. 3).

An intensity distribution of the illumination light B or other illumination light that induces or modulates the light emissions from the emitter E comprising a local minimum, at least one maximum, and at least one intensity increasing area is then shifted sequentially with respect to the sample 2 in steps 104a and 104b such that the local minimum is located at the illumination positions 20.

In step 105, the sample 2 is illuminated at the illumination positions 20 with the intensity distribution of the illumination light B, and the light emissions from the emitter E are detected for each illumination position 20.

In step 106, a check is made to determine whether the predetermined number of illumination positions 20 has been reached, or whether additional illumination positions 20 follow.

Based on the detected light emissions, the location of the emitter E is then determined with high accuracy in step 107, e.g., using a maximum likelihood position estimator.

The second localization method may be performed in multiple iterations, using the location of emitter E determined in step 107 to determine new illumination positions 20, in particular those that are closer in distance to the determined location than in the previous iteration.

The location correction data 25 may comprise, for example, correction values or correction vectors 23, which may in particular be part of a correction network 21.

Figure 2C:
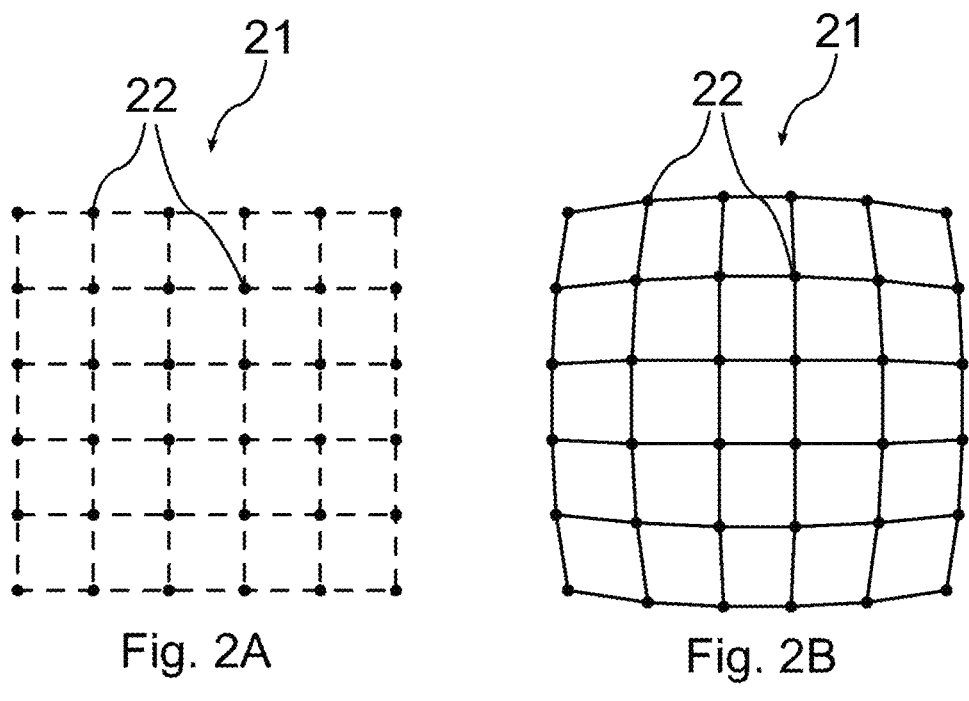
Figure 2C:
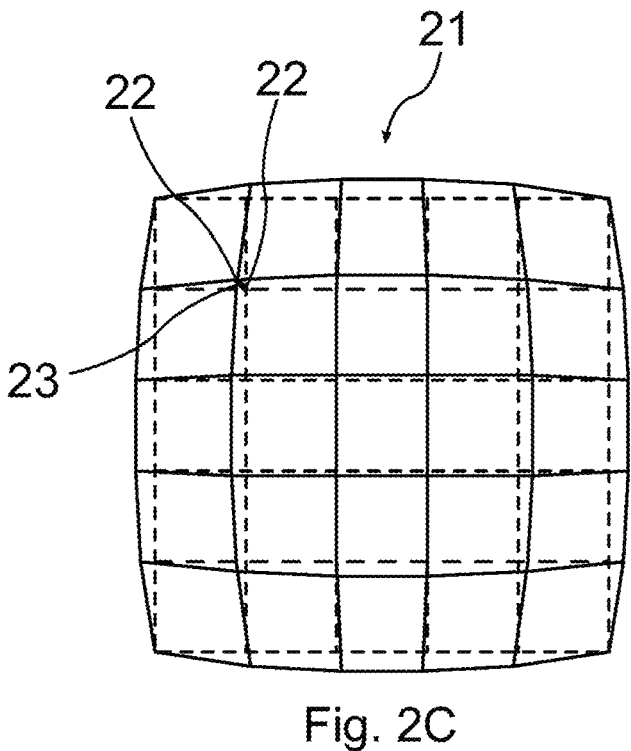

The location correction by means of such correction networks 21 is shown schematically in FIG. 2A to FIG. 2C and FIG. 3A to FIG. 3B. FIG. 2A shows a first correction network 21 consisting of nodes 22, which form a coordinate system of a location determination by means of the first localization step. FIG. 2B shows a second correction network 21 with nodes 22, which transforms the location of the emitter E in coordinates of the first localization step into the coordinate system of the second localization step. FIG. 2C shows the superposition of the two correction networks 21 shown in FIG. 2A and FIG. 2B. A correction vector 23 is shown between two corresponding nodes 22, which defines for these two nodes 22 the coordinate transformation from the coordinate system of the first localization step into the coordinate system of the second localization step.

Figures 3A, 3B:
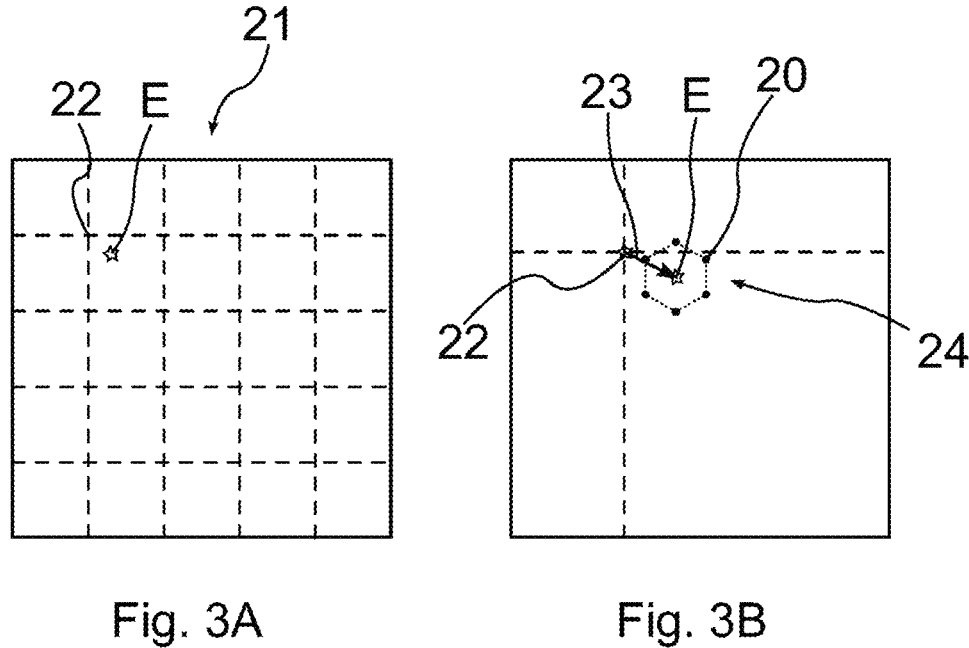
FIG. 3A to FIG. 3B shows an example of a location correction.

FIG. 3A shows the location of the emitter E relative to the first correction network 21 determined in the first localization step. FIG. 3B shows the corrected location of emitter E in the coordinates of the second localization step used to determine the illumination positions 20, and a correction vector 23 between these locations. The illumination positions 20 form a hexagonal illumination pattern 24, the center of the illumination pattern 24 being located at the corrected location of the emitter E.

Figure 4:
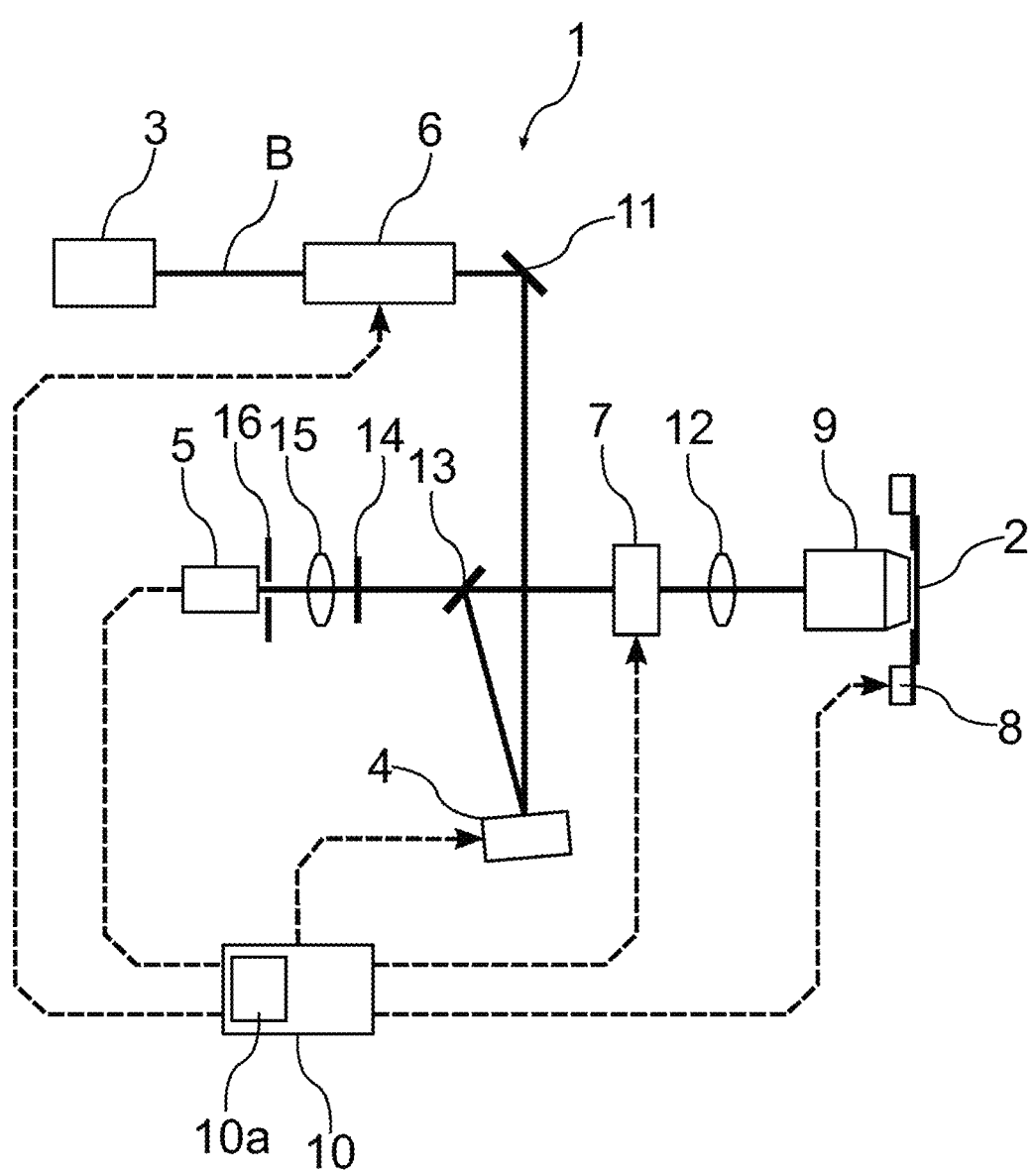
FIG. 4 shows a first embodiment of a light microscope according to the present disclosure.

FIG. 4 shows an embodiment of a light microscope 1 according to the present disclosure for localizing individual emitters E in a sample 2. The light microscope 1 comprises a light source 3, e.g., a laser, for generating a light beam of illumination light B. The light beam passes through a beam positioning device 6, e.g. in the form of one or more electro-optical deflectors, and is reflected at a mirror 11 onto a light modulator 4, which modulates the phase of the illumination light B to produce a light distribution of the illumination light B with a local minimum, e.g. a 2D donut or a 3D donut (bottle beam), at the focus in the sample 2.

The phase-modulated light beam is then reflected at a dichroic beam splitter 13 and passes through another beam positioning device 7, in particular a galvanometric scanner, and a tube lens 12 to an objective 9, which focuses the illumination light B into the sample 2.

The sample 2 is held by a sample holder which is movable via a sample positioning device 8, in particular a piezoelectric actuator.

Light emitted from emitters E in sample 2 is transmitted by the dichroic beam splitter 13 and passes through an emission filter 14, a lens 15, and a confocal pinhole 16 to a detector 5, which detects the light emissions from the emitters E.

The light microscope 1 further comprises a control and computing unit 10 with a memory 10a, wherein the control and computing unit 10 is configured to receive data from the detector 5, to determine the location of an individual emitter E in the sample from the light emissions detected by the detector 5, and to determine the illumination positions 20 for the second localization step on the basis of the location of the emitter E determined in the first localization step. For this purpose, the control and computing unit 10 uses the location correction data 25 (See FIG. 1) stored in the memory 10a, in particular correction values or correction vectors 23.

Based on the illumination positions 20 thus determined, in the second localization step, the control and computing unit 10 controls in particular the beam positioning devices 6 and/or 7 and/or the sample positioning device 8 so that the minimum of the intensity distribution of the illumination light B is successively positioned at the illumination positions 20. Then, based on the light emissions detected in the second localization step and the corresponding illumination positions the control and computing unit 10 calculates the location of the emitter E in the sample 2 with high accuracy.

Figure 5:
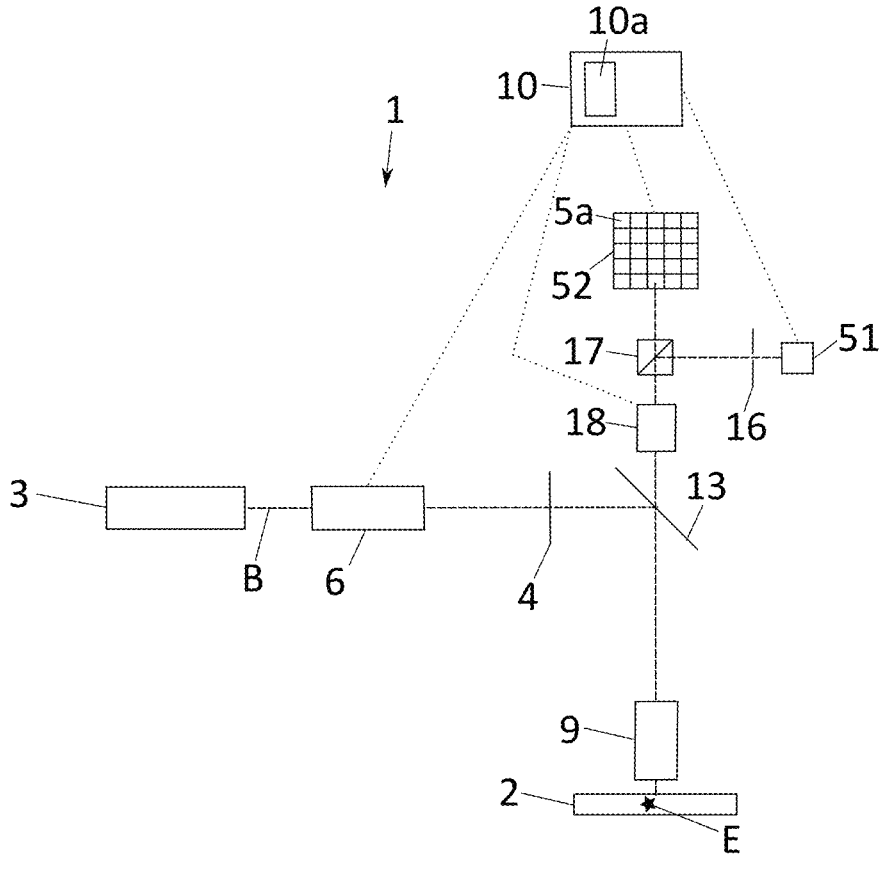
FIG. 5 shows a second embodiment of a light microscope according to the present disclosure.

FIG. 5 shows a further embodiment of a light microscope 1 according to the invention, which is largely analogous to the light microscope 1 shown in FIG. 4 except for the detection beam path. The light emitted by the emitter 2 and transmitted by the dichroic beam splitter 13 passes through a beam splitter 17 which splits the light into two partial beam paths. In one partial beam path there is a spatially resolving detector 52 with several detector elements 5a arranged in a detection plane (image plane with respect to the focal plane in the sample), e.g., a camera or a so-called SPAD array (a two-dimensional arrangement of single photon counting avalanche photodiodes). The other partial beam path contains (as in the light microscope 1 shown in FIG. 4) a point detector 51 arranged behind a confocal pinhole 16.

The beam splitter 17 may be a neutral beam splitter (e.g., a 50/50 beam splitter), so that a portion of the emitted light always reaches both the point detector 51 and the spatially resolving detector 52. Alternatively, the beam splitter 17 may be a polarization beam splitter, for example. In this case, the polarization direction of the emitted light may be rotated by an optional switching element 18 (e.g., a Pockels cell with an upstream λ/2 plate) by sending a control signal from the control and computing unit 10, so that the emitted light selectively reaches one of the two partial beam paths.

In particular, the first localization step uses the spatially resolving detector 52 and the second localization step uses the point detector 51 for detection. The use of a spatially resolving detector 52 in the first localization step has in particular the advantage that several emitters E can be found and pre-localized in parallel. However, if, for example, a SPAD array of sufficient size is used as the spatially resolving detector 52, the point detector and the beam splitter 17 can be dispensed with if necessary, since such a detector is suitable for a MINFLUX method in particular because of its ability to detect single photons.

Illumination may also be switched between the first localization step and the second localization step as needed (not shown). For example, in the first localization step, the sample 2 may be illuminated in wide field with the illumination light B and in the second localization step, the illumination light B may be focused into the sample 2 to generate and reposition the intensity distribution with the local minimum in the sample 2.

LIST OF REFERENCE SIGNS

1 Light microscope
2 Sample
3 Light source
4 Light modulator
5 Detector
5a Detector element
6 Beam positioning device, in particular electro-optical modulator
7 Beam positioning device, especially galvo scanner
8 Sample positioning device, especially piezo actuator
9 Objective
10 Control and computing unit
10a Memory
11 Mirror
12 Tube lens
13 Dichroic beam splitter
14 Emission filter
15 Lens
16 Pinhole
17 Beam splitter
18 Switching element
20 Illumination position
21 Correction network
22 Node
23 Correction vector
24 Illumination pattern
25 Location correction data
51 Point detector
52 Spatially resolving detector
101 Selecting an emitter
102 First determination of the location of the emitter
103 Setting illumination positions
104a Positioning the illumination light at a first illumination position
104b Positioning the illumination light at the next illumination position
105 Illuminating the emitter and detecting light emissions
106 Checking whether the last illumination position has been reached
107 Second determination of the location of the emitter
B Illumination light
E Emitter

The invention claimed is:

1. A method for localizing individual emitters in a sample with a first localization step comprising the method steps of
illuminating the sample with illumination light, wherein the illumination light induces or modulates light emissions of an emitter;
detecting the light emissions of the emitter;
determining a first location of the emitter in the sample from the detected light emissions;
and a second localization step with an increased accuracy compared to the first localization step, comprising the following method steps
illuminating the emitter with an intensity distribution of the illumination light or of another illumination light, comprising a local minimum in at least one spatial direction at illumination positions arranged around the first location of the emitter determined in the first localization step;
detecting the light emissions of the emitter for the illumination positions;

determining a second location of the emitter from the light emissions detected for the illumination positions;
wherein the first location of the emitter determined in the first localization step comprises a systematic deviation with respect to the second location of the same emitter determined in the second localization step, and wherein a location correction compensating for the systematic deviation is applied in order to determine the illumination positions in the second localization step.

2. The method according to claim 1, wherein the first localization step is performed according to a stochastic localization method.

3. The method according to claim 1, wherein the first localization step is performed by scanning the sample with the illumination light.

4. The method according to claim 1, wherein the first localization step is performed according to a MINFLUX principle.

5. The method according to claim 1, wherein the emitter is imaged onto a position-resolving detector in the first localization step.

6. The method according to claim 1, wherein the systematic deviation is caused by optical imaging errors.

7. The method according to claim 1, wherein the first localization step and the second localization step are carried out with optical means which differ from one another in at least one optical element.

8. The method according to claim 1, wherein position-dependent correction values or correction vectors are used for the location correction.

9. The method according to claim 8, wherein the correction values or correction vectors comprise a rotational symmetry with respect to an optical axis or such a rotational symmetry is assumed.

10. The method according to claim 8, wherein the first and the second localization step are repeatedly carried out on different emitters and wherein initially assumed correction values or correction vectors are updated in each case after the second localization step using a difference of between the first location of the emitter determined in the first localization step and the second location of the emitter determined in the second localization step.

11. The method according to claim 1, wherein the systematic deviation is modeled by correction values or correction vectors arranged at nodes of a correction network.

12. The method according to claim 11, wherein the location correction is calculated by interpolation of several correction values or correction vectors of the correction network.

13. The method according to claim 11, wherein after the second localization step correction values or correction vectors of the correction network are updated or additional nodes with correction values or correction vectors are added to the correction network.

14. The method according to claim 1, wherein the systematic deviation is modeled by a parameterized compensation model.

15. The method according to claim 14, wherein the first and the second localization step are repeatedly executed with different emitters, wherein parameters of the parameterized compensation model are updated after the second localization step, respectively.

16. The method according to claim 1, wherein the correction values or correction vectors are calculated using a machine learning algorithm.

17. A light microscope for localizing individual emitters in a sample according to a method according to claim 1 comprising a light source for illuminating the sample with illumination light, wherein the illumination light induces or modulates light emissions from emitters in the sample, a beam positioning device, which is configured to generate in the sample, position in the sample, or generate and position in the sample, an intensity distribution of the illumination light or of another illumination light having a local minimum in at least one spatial direction, at least one detector configured to detect light emissions of the emitters, a control and computing unit comprising a memory for correction values or correction vectors, which is configured to, in a first localization step i. control the light source such that the light source illuminates an emitter with the illumination light, and control the detector so that the detector detects the light emissions of the emitter;

ii. determine a first location of the emitter in the sample from the light emissions detected with the detector;

and which is further configured to, in a second localization step:

iii. calculate illumination positions around the first location of the emitter determined in the first localization step using correction values or correction vectors stored in the memory;

iv. control the beam positioning device in such a way that the light source illuminates the sample with the intensity distribution of the illumination light or of the other illumination light having a local minimum at the illumination positions;

v. control the detector or a further detector in such a way that the detector or the further detector detects the light emissions of the emitter for the illumination positions;

vi. calculate a second location of the emitter in the sample from the detected light emissions.

18. The light microscope according to claim 17, wherein the detector or the further detector comprises a plurality of detector elements.

19. The light microscope according to claim 17, wherein the control and computing unit is configured such that the correction values or correction vectors stored in the memory are updated or supplemented after the second localization step.

20. A non-transitory computer readable medium for storing computer instructions for localizing individual emitters in a sample that, when executed by one or more processors associated with a light microscope causes the one or more processors to perform a method according to claim 1.

\* \* \* \* \*